United States Patent [19]

Piccolo et al.

[11] 3,926,608

[45] Dec. 16, 1975

[54] COMPOSITIONS FOR SOIL IMPROVEMENT AND PROCESS FOR THEIR PRODUCTION

[75] Inventors: Luigi Piccolo; Antonio Paolinelli, both of Milan, Italy

[73] Assignee: Societa' Italiana Resine S.I.R. S.p.A., Milan, Italy

[22] Filed: Mar. 8, 1974

[21] Appl. No.: 449,565

[30] Foreign Application Priority Data

Mar. 8, 1973   Italy.................................. 21319/73

[52] U.S. Cl....................... 71/1; 71/64 SC; 71/64 G
[51] Int. Cl.²............................................. A01N 7/02
[58] Field of Search... 71/64 G, 64 F, 64 SC, 64 JC, 71/27, 51, 53, 59, 1, 63; 117/100 A, 100 C; 260/2.5 B

[56] References Cited
UNITED STATES PATENTS

| | | | |
|---|---|---|---|
| 2,623,819 | 12/1952 | Paolini et al............................ | 71/24 |
| 3,473,255 | 10/1969 | Working............................ | 71/64 SC |
| R25,438 | 8/1963 | Nelson................................ | 71/64 G |

Primary Examiner—Frank A. Spear, Jr.
Assistant Examiner—Ferris H. Lander
Attorney, Agent, or Firm—Sughrue, Rothwell, Mion, Zinn & Macpeak

[57] ABSTRACT

Compositions for the improvement of soils, particularly compact soils having a clay structure, consisting of the interaction product of small foamed polystyrene plastic particles with one or more ferric salts.

The composition for improving soils can be prepared by spraying an ammonium iron alum solution at a 30 – 55% by weight concentration onto foamed polystyrene plastic particles while maintaining the temperature at 100° – 125°C.

5 Claims, No Drawings

COMPOSITIONS FOR SOIL IMPROVEMENT AND PROCESS FOR THEIR PRODUCTION

BACKGROUND OF THE INVENTION

1. Field of the Invention

The invention relates to highly effective, easily and economically usable compositions for improving compact soils as well as a process for their production.

2. Description of the Prior Art

It is well-known that in many countries of the world there are wide areas with particularly compact soils, mostly clay soils, which are little suited for cultivation.

Due to the disposition of the soil particles the structure of these soils practically does not permit any circulation of air and water.

In these soils water can penetrate only in small amounts causing the clay particles to swell so that the pores are closed and further penetration of water and circulation of air are prevented.

During rainy periods there is therefore practically no possibility for the necessary water reserves to build up in the cultivatable layer of the soils.

On the other hand, during dry periods the water in the soils rises through continuous capillaries, which are characteristic for compact clay soils, to the surface carrying along the salts dissolved therein.

The soils thus assume a state of dryness which leads to the formation of deep cracks and to the agglomeration of the clay particles to a hard and very compact mass.

Under these conditions the biological cycle is rendered more difficult not only due to the lack of water and insufficient air circulation but also because of the high salt concentration at the surface.

In soils which have a granular porous structure water and air can freely penetrate into the spaces between the granules of the soil so that the aforementioned drawbacks are avoided.

These latter soils mostly have a stable water supply, which has a favorable effect on crops making them subsist even for long periods of dryness. The reason therefor lies in the fact that in these soils evaporation is restricted to the upper part of the cultivatable layer since there is no system of continuous capillaries as is the case with compact soils.

Methods for improving the properties of compact soils, especially clay soils, in order to make them cultivatable often employ salts, normally ferric salts, such as ammonium iron alum and ferric sulfate. These salts cause the clay particles to agglomerate so as to impart to the soil an almost granular structure, which leads to a marked improvement in water permeability and air circulation.

To achieve the desired aim, however, large amounts of these salts are required. Moreover, the salts are effective only for a limited period of time and above all difficult to apply to the soils to be improved.

This involves economical drawbacks which make these methods less favorable.

Substances for improving compact soils on the basis of ferric salts have now been found which have a better and longer lasting activity than pure ferric salts and can be more easily and economically applied to the soils.

SUMMARY OF THE INVENTION

An object of this invention therefore is to provide compositions for improving compact soils, which can be easily applied and have a rapid effect on the physical state of the soils by causing an immediate and effective agglomeration of the small clay particles so that the soils obtain a granular structure permitting great water permeability and air circulation.

The inventive compositions for improving compact soils consist of an interaction product of small foamed polystyrene plastics particles and one or more ferric salts.

DETAILED DESCRIPTION OF THE INVENTION

It is already known in the art that foamed polystyrene may be used for improving compact soils. However, these applications did not prove successful because of the limited activity of foamed polystyrene and above all because of its low compatibility with the soils. This means that no sufficiently compact granules are formed which could resist washing out by rain.

According to this invention it has now been found that foamed polystyrene may be advantageously used as an effective improver of compact soils with good compatibility if a certain interaction occurs with one or more ferric salts.

It was furthermore found that the activity of ferric salts which were known per se to be useful in improving compact soils increases after a certain interaction took place with foamed polystyrene particles, and that these compounds can be applied to the soils more easily and in larger amounts than in the absence of an interaction between the salts and foamed polystyrene.

In a preferred embodiment of this invention iron alum (ammonium iron disulfate) is used as ferric salt and applied on foamed polystyrene having an apparent density of 8 to 30 kg/m$^3$ and a particle size of 0.01 to 3 mm. In this embodiment it is of special importance that for iron alum to interact with the foamed polystyrene, the weight ratio between alum and foamed polystyrene is in the range of 3:1 to 30:1.

The shape of the foamed polystyrene particles is not critical.

Spherical particles or regular shapes in general may be used, while particles of irregular size and shape as are obtained in the direct grinding of foamed polystyrene also yield satisfactory results.

It is an economically favorable aspect of this invention that also polystyrene scrap may be used, provided it has the aforementioned density and particle size. Instead of alum, other ferric salts may be brought to interact with the foamed polystyrene, alone or in a mixture; however the results to be achieved are less satisfying.

The various process steps for preparing the inventive soil-improving compositions have no notable effect on these substances. The interaction between a ferric salt and foamed polystyrene particles may, for instance, be achieved by spraying on these particles in a drum drier a concentrated salt solution of preferably 30 to 55 percent by weight at a temperature of 100° to 125°C. As an optional measure preferably dry inert gas may be passed through in order to facilitate the evaporation of water.

Also, the fluidized bed technique may be applied, or the salt may be allowed to crystallize directly on the foamed polystyrene particles being in contact with a saturated salt solution.

The reaction vessel to be used involves no particular difficulties either.

Jacketed vessels, pelletizing drums or devices suitable for the fluidized bed technique may be employed.

The inventive soil-improving compositions are applied to the soils according to essentially the following method: in order to improve the surface layer of the soil the compositions are placed on the soil after harrowing and the soil is harrowed again to cover the compositions with soil. In order to improve the depth effect, however, the compositions are placed on the soil during plowing. Naturally the soil-improving compositions are always applied when the soil is moist and accordingly has a granular structure.

The amounts of soil-improving compositions required depend on the degree of compactness of the soil but never exceed 300 to 30,000 kg per hectare (10,000 m$^2$).

Numerous and remarkable are the advantages to be achieved when using the inventive soil-improving compositions as compared to the substances hitherto known in the art. The outstanding feature of the inventive soil-improving compositions, apart from their great activity and simple as well as economic production, is that they are available in a completely dry state in the form of small homogeneous granules not subject to caking.

The compositions can therefore be uniformly applied to and distributed on the soil. Owing to the agglomerating effect of the inventive compositions on the clay particles, the soils obtain a completely uniform granular structure, with an optimum ratio being achieved between the space taken by the granules and the free spaces between the granules. Due to the regularity of the structure thus obtained and due to its porosity, water permeability and air circulation are enhanced, which entails a considerable increase with various crops and the cultivation of soils hitherto not cultivatable.

Another advantage not to be underestimated is the stability of the soil granules formed by the favorable activity of the inventive soil-improving compositions over a considerable period of time, which also guarantees a considerable stability of the soils treated.

The invention will be illustrated in more detail by the following examples, without thereby limiting the scope of the invention.

Comparative examples 2 and 3 describe the soil-improving effect of iron alum and non-interacted foamed polystyrene.

Example 4, which is also a comparative example, describes the soil-improving effect of a mechanical mixture of alum and foamed polystyrene without the two compounds having interacted on each other or without in other words the alum having been deposited on the foamed polystyrene.

EXAMPLE 1

Into an oblique rotating flat vessel equipped with a heating jacket 10 liter of ground foamed polystyrene particles with a particle size of 0.05 to 0.8 mm and an apparent density of 20 kg/m$^3$ were introduced.

Subsequently the polystyrene particles were heated by the heating jacket to 120°C. During heating the particles were kept moving by rotation.

During rotation and while maintaining a temperature of 120°C 50 percent by weight of an aqueous solution of ammonium iron alum [$Fe_2(SO_4)_3 \cdot (NH_4)_2SO_4 \cdot 24H_2O$] were sprayed for 2 hours on the surface of the particles at a rate of 2 kg/h.

The temperature was kept at 120°C for another 2 hours while the vessel rotated, and then reduced to ambient temperature (about 25°C). The material taken from the vessel had the form of a homogeneous, free-flowing, finely dispersed powder of dark-violet color and an alum content of 91 percent by weight.

In a laboratory test a sample of this material was mixed with bentonite, type ULTRAGEL 300, manufactured by Settimio Cinicola, in an amount of 5 percent by weight, based on the bentonite. The mixture was moistened and allowed to stand for 30 hours. Subsequently a comparative test with the filtration rate of pure bentonite was carried out.

The treated bentonite showed an increase in the filtration rate of about 550%.

When placing the mixture 20 cm deep on a field of alkaline clay soil in an amount of 15,000 kg/ha, barley and oats crops showed an increase of about 165% and about 150%, respectively, over crops grown on untreated soil.

EXAMPLE 2 (COMPARATIVE EXAMPLE)

A laboratory test was carried out as in example 1, with the exception that bentonite was only admixed with ammonium iron alum in an amount of about 4.5 percent by weight, based on the bentonite, the weight ratio between bentonite and alum being the same as in example 1.

The mixture was treated as in example 1.

Subsequently the test comparing the filtration rate of treated bentonite with that of pure bentonite was carried through. Treated bentonite showed an increase in the filtration rate of about 375%.

When applying the mixture on soil under the same conditions as in example 1 in an amount of 13,500 kg, ammonium iron alum per hectare, barley and oats crops increased by about 95% and about 70%, respectively.

EXAMPLE 3 (COMPARATIVE EXAMPLE)

A laboratory test as in example 1 was carried out, with the exception that bentonite was only admixed with foamed polystyrene having the same properties as that used with alum in example 1, in an amount of 0.5 percent by weight, based on the bentonite. In this manner approximately the same weight ratio between bentonite and foamed polystyrene was obtained as in example 1.

The mixture was then treated in accordance with example 1. Subsequently the test comparing the filtration rate of treated bentonite with that of pure bentonite was carried out which showed that the filtration rate of treated bentonite increased by as little as about 20%.

In a soil application test carried out under identical conditions as in example 1, using 1,500 kg/ha of foamed polystyrene of the type used for preparing the soil-improving composition of example 1, barley and oats crops increased by as little as 15% and about 20%, respectively.

EXAMPLE 4 (COMPARATIVE EXAMPLE)

A laboratory test as in example 1 was carried out, with the exception that bentonite was admixed with a mechanical mixture of ammonium iron alum and foamed polystyrene of the same type and weight ratio as in example 1, without these compounds having interacted on each other.

According to example 1 a test comparing the filtration rate of treated bentonite with that of pure bentonite was carried through, showing that the filtration rate of treated bentonite increased by about 390%.

In a soil application test carried out under the same conditions as in example 1, using 15,000 kg/ha of the mechanical mixture, barley and oats crops showed an increase of as little as about 105% and about 90%, respectively.

We claim:

1. Compositions for improving soils, particularly compact soils of substantially clay structure, characterized in that they consists of interaction products of small foamed polystyrene plastics particles with ammonium iron alum, the weight ratio of ammonium iron alum to the polystyrene particles being in the range of 3:1 to 30:1, the foamed polystyrene particles having an apparent density of 8 to 30 kg/m$^3$ and a particle size of 0.01 to 3 mm.

2. A process for preparing soil-improving compositions characterized in that an ammonium iron alum solution in a concentration of 30 to 55 percent by weight is sprayed on foamed polystyrene particles, the temperature being kept at between 100° and 125°C, said polystyrene particles having a particles size of 0.01 to 3 mm and an apparent density of 8 to 30 kg/m$^3$, the weight ratio of ammonium iron alum to the polystyrene particles being in the range of 3:1 to 30:1.

3. The process of claim 2 wherein the foamed polystyrene particles are contacted with a saturated ammonium iron alum solution and the alum is allowed to crystallize directly on the polystyrene particles.

4. The process of claim 2, characterized in that an alum solution in a concentration of 30 to 55 percent by weight is used.

5. The process of claim 2 wherein a countercurrent of an inert gas is maintained during the process.

* * * * *